US012657457B2

(12) United States Patent
Bar Eliyahu et al.

(10) Patent No.: US 12,657,457 B2
(45) Date of Patent: Jun. 16, 2026

(54) SUPERVISED MACHINE LEARNING METHOD FOR MATCHING UNSUPERVISED DATA

(71) Applicant: Intuit Inc., Mountain View, CA (US)

(72) Inventors: Natalie Bar Eliyahu, Petah Tikva (IL);
Hadar Lackritz, Tel Aviv (IL); Sigalit Bechler, Petah Tikva (IL); Yaakov Tayeb, Petah Tikva (IL)

(73) Assignee: Intuit Inc., Mountain View, CA (US)

( * ) Notice: Subject to any disclaimer, the term of this patent is extended or adjusted under 35 U.S.C. 154(b) by 436 days.

(21) Appl. No.: 17/733,415

(22) Filed: Apr. 29, 2022

(65) Prior Publication Data

US 2023/0351172 A1     Nov. 2, 2023

(51) Int. Cl.
*G06N 3/08* (2023.01)
*G06N 7/01* (2023.01)

(52) U.S. Cl.
CPC ................ *G06N 3/08* (2013.01); *G06N 7/01* (2023.01)

(58) Field of Classification Search
CPC ................................. G06N 3/08; G06N 7/005
See application file for complete search history.

(56) References Cited

U.S. PATENT DOCUMENTS

| | | | |
|---|---|---|---|
| 6,885,985 B2 * | 4/2005 | Hull | G06F 40/49 704/277 |
| 8,160,975 B2 * | 4/2012 | Tang | G06K 9/6269 706/12 |

| | | | |
|---|---|---|---|
| 10,199,034 B2 * | 2/2019 | Conkie | G10L 13/08 |
| 10,417,350 B1 * | 9/2019 | Mohamed | G06N 20/00 |
| 10,726,733 B2 * | 7/2020 | Apokatanidis | G06F 40/56 |
| 11,379,736 B2 * | 7/2022 | Trischler | G06N 5/04 |
| 2001/0014902 A1 * | 8/2001 | Hu | G06F 40/49 715/236 |
| 2004/0111253 A1 * | 6/2004 | Luo | G10L 15/1822 704/4 |
| 2010/0161316 A1 * | 6/2010 | Haug | G06F 40/216 704/9 |

(Continued)

OTHER PUBLICATIONS

Fuzzywuzzy.PyPI; Fuzzy String Matching in Python; Feb. 13, 2020 (5 pages). https://pypi.org/project/fuzzywuzzy/.

*Primary Examiner* — Viker A Lamardo
*Assistant Examiner* — Ababacar Seck
(74) *Attorney, Agent, or Firm* — Lathrop GPM LLP

(57)                    ABSTRACT

A method including receiving first and second natural language texts. A distance metric is generated from the first and second natural language texts. A first machine learning system is executed, the first machine learning system taking, as a first input, the distance metric and generating, as a first output, a first probability that the first natural language text matches the second natural language text. A second machine learning system is executed, the second machine learning system taking as a second input the first natural language text and as a third input the second natural language text, and generating, as a second output, a second probability that the first natural language text matches the second natural language text. A third probability that the first natural language text matches the second natural language text is generated. Generating includes combining the first probability and the second probability.

15 Claims, 12 Drawing Sheets

(56)                    References Cited

U.S. PATENT DOCUMENTS

| | | | | |
|---|---|---|---|---|
| 2014/0122381 A1* | 5/2014 | Nowozin | G06N 20/00 | 706/12 |
| 2014/0297267 A1* | 10/2014 | Spencer | G06F 3/04886 | 704/9 |
| 2015/0186793 A1* | 7/2015 | Ioffe | G06N 20/00 | 706/12 |
| 2017/0270101 A1* | 9/2017 | Kopru | H04L 67/01 | |
| 2018/0225280 A1* | 8/2018 | Dugan | G06N 20/00 | |
| 2019/0020670 A1* | 1/2019 | Brabec | G06N 7/005 | |
| 2019/0102337 A1* | 4/2019 | Brabec | H04L 63/145 | |
| 2019/0155947 A1* | 5/2019 | Chu | G06F 16/358 | |
| 2019/0377825 A1* | 12/2019 | Chang | G06F 40/247 | |
| 2020/0126533 A1* | 4/2020 | Doyle | G10L 15/063 | |
| 2020/0285940 A1* | 9/2020 | Sprechmann | G06N 3/084 | |
| 2020/0320428 A1* | 10/2020 | Chaloulos | G06N 20/00 | |
| 2020/0327285 A1* | 10/2020 | Cox | G06F 16/90348 | |
| 2021/0150270 A1* | 5/2021 | Agarwalla | G06F 18/2148 | |
| 2021/0294974 A1* | 9/2021 | Gao | G06F 40/166 | |
| 2021/0357595 A1* | 11/2021 | Perez | G06N 3/0454 | |
| 2022/0207240 A1* | 6/2022 | Björkqvist | G06N 3/084 | |
| 2022/0414319 A1* | 12/2022 | de Oliveira | G06F 40/284 | |
| 2023/0135335 A1* | 5/2023 | Makino | G06V 30/19093 | 704/9 |

\* cited by examiner

START

RECEIVE A LIST OF NATURAL LANGUAGE TEXT TERMS COMPRISING SETS OF PARTIALLY MATCHING TERMS ⟋ 250

PERFORM ACTIONS FOR EACH PAIR OF TERMS OF THE SETS OF PARTIALLY MATCHING TERMS, INCLUDING EXECUTING THE METHOD OF FIG. 2A. ⟋ 252

THIRD PROBABILITY EXCEEDS THRESHOLD VALUE? ⟋ 254

NO

YES

REMOVE ONE OF THE FIRST TERM OR THE SECOND TERM ⟋ 256

END

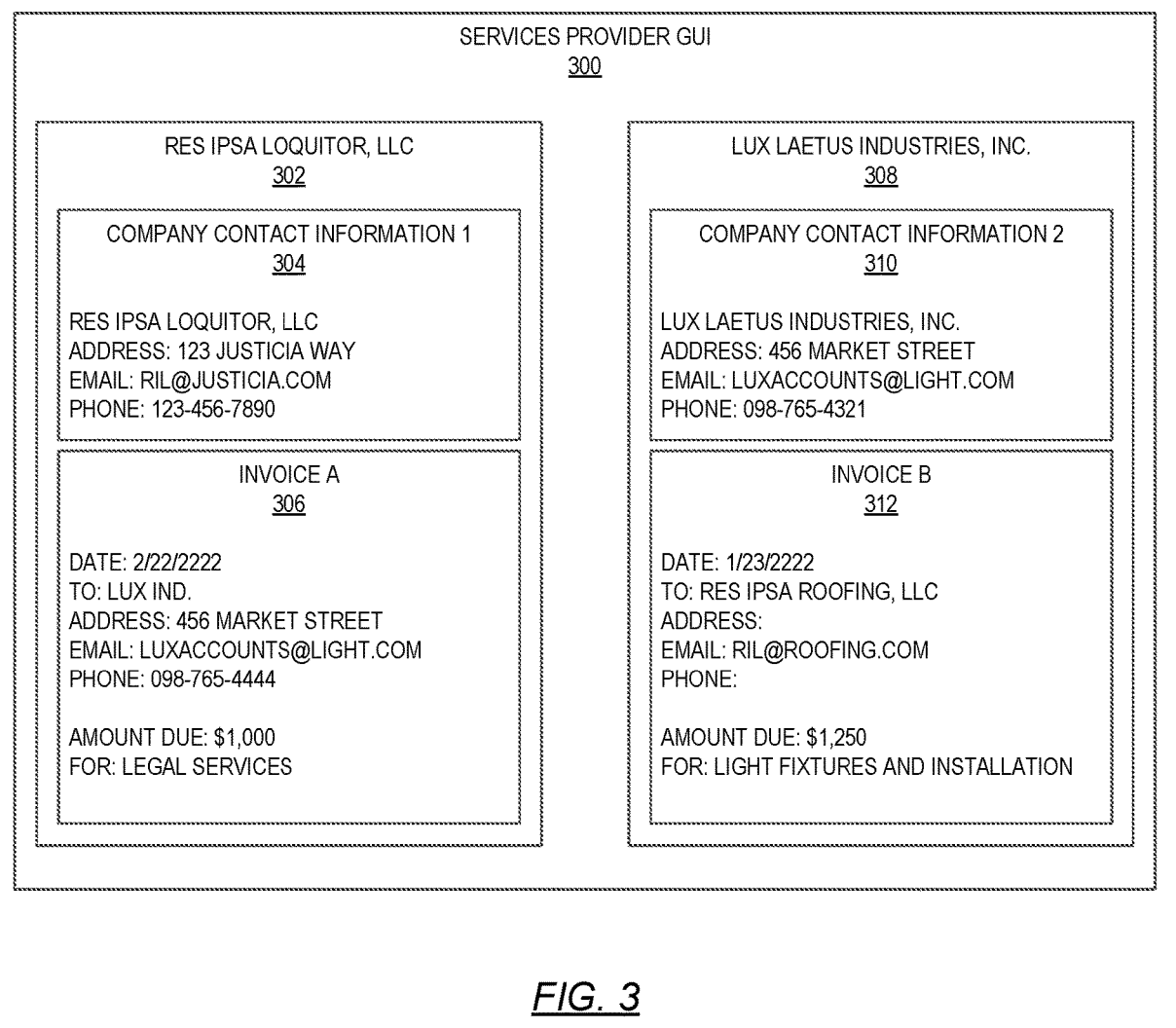

SERVICES PROVIDER GUI
300

RES IPSA LOQUITOR, LLC
302

COMPANY CONTACT INFORMATION 1
304

RES IPSA LOQUITOR, LLC
ADDRESS: 123 JUSTICIA WAY
EMAIL: RIL@JUSTICIA.COM
PHONE: 123-456-7890

INVOICE A
306

DATE: 2/22/2222
TO: LUX IND.
ADDRESS: 456 MARKET STREET
EMAIL: LUXACCOUNTS@LIGHT.COM
PHONE: 098-765-4444

AMOUNT DUE: $1,000
FOR: LEGAL SERVICES

LUX LAETUS INDUSTRIES, INC.
308

COMPANY CONTACT INFORMATION 2
310

LUX LAETUS INDUSTRIES, INC.
ADDRESS: 456 MARKET STREET
EMAIL: LUXACCOUNTS@LIGHT.COM
PHONE: 098-765-4321

INVOICE B
312

DATE: 1/23/2222
TO: RES IPSA ROOFING, LLC
ADDRESS:
EMAIL: RIL@ROOFING.COM
PHONE:

AMOUNT DUE: $1,250
FOR: LIGHT FIXTURES AND INSTALLATION

FIG. 3

SUPERVISED MACHINE LEARNING METHOD FOR MATCHING UNSUPERVISED DATA

BACKGROUND

Data deduplication is a computer science task which removes duplicate terms in two related databases, particularly when the same entity in both databases may have different names or identifiers. When the two databases contain natural language text, an unsupervised machine learning system is appropriate to use, as an unsupervised system is suitable for use with natural language text. However, an unsupervised system may not produce results accurate enough for a particular deduplication implementation. While a supervised system may achieve more accurate results, supervised system may be unsuitable to use on natural language text.

SUMMARY

The one or more embodiments provide for a method. The method includes receiving a first natural language text and receiving a second natural language text, different than the first natural language text. The method also includes generating a distance metric from the first natural language text and the second natural language text. The method also includes executing a first machine learning system, the first machine learning system taking, as a first input, the distance metric and generating, as a first output, a first probability that the first natural language text matches the second natural language text. The method also includes executing a second machine learning system, the second machine learning system taking as a second input the first natural language text and as a third input the second natural language text, and generating, as a second output, a second probability that the first natural language text matches the second natural language text. The method also includes generating a third probability that the first natural language text matches the second natural language text. Generating includes combining the first probability and the second probability.

The one or more embodiments also provide for a system. The system includes a processor and a data repository in communication with the processor. The data repository stores a first natural language text and a second natural language text, different than the first natural language text. The data repository also stores a distance metric representing a distance between the first natural language text and the second natural language text. The data repository also stores a first probability that the first natural language text matches the second natural language text. The data repository also stores a second probability that the first natural language text matches the second natural language text. The data repository also stores a third probability that the first natural language text matches the second natural language text. The system also includes a server controller executable by the processor. The server is executable by the processor to receive the first natural language text and the second natural language text. The server is also executable by the processor generate the distance metric from the first natural language text and the second natural language text. The system also includes a first machine learning system comprising a first unsupervised machine learning system configured to obtain as a first input the distance metric and generate as a first output the first probability. The system also includes a second machine learning system comprising a second unsupervised machine learning system configured to execute the second machine learning system, the second machine learning system taking as a second input the first natural language text and as a third input the second natural language text, and generate as a second output the second probability. The system also includes a metamodel comprising a second supervised machine learning system configured to obtain as input the first probability and the second probability and generate, as output, the third probability.

The one or more embodiments also provide for a method of deduplication. The method also includes receiving a list of natural language text terms comprising sets of partially matching terms. The method also includes performing actions for each pair of terms of the sets of partially matching terms. The actions include generating a distance metric from a pair of terms. The actions also include executing a first machine learning system, the first machine learning system taking, as a first input, the distance metric and generating, as a first output, a first probability that the pair of terms match each other. The actions also include executing a second machine learning system, the second machine learning system taking as a second input a first term of the pair of terms and as a third input a second term of the pair of terms, and generating, as a second output, a second probability that the pair of terms match each other. The actions also include generating a third probability that the pair of terms match each other. Generating includes combining the first probability and the second probability. The method also includes removing, responsive to the third probability exceeding a threshold value, one of the first term or the second term from the list.

Other aspects of the one or more embodiments will be apparent from the following description and the appended claims.

BRIEF DESCRIPTION OF DRAWINGS

FIG. 3, FIG. 4, and FIG. 5 show an example of an application of a supervised machine learning method for matching unsupervised data to deduplication of text among two related databases, in accordance with one or more embodiments.

DETAILED DESCRIPTION

Figure 1A:
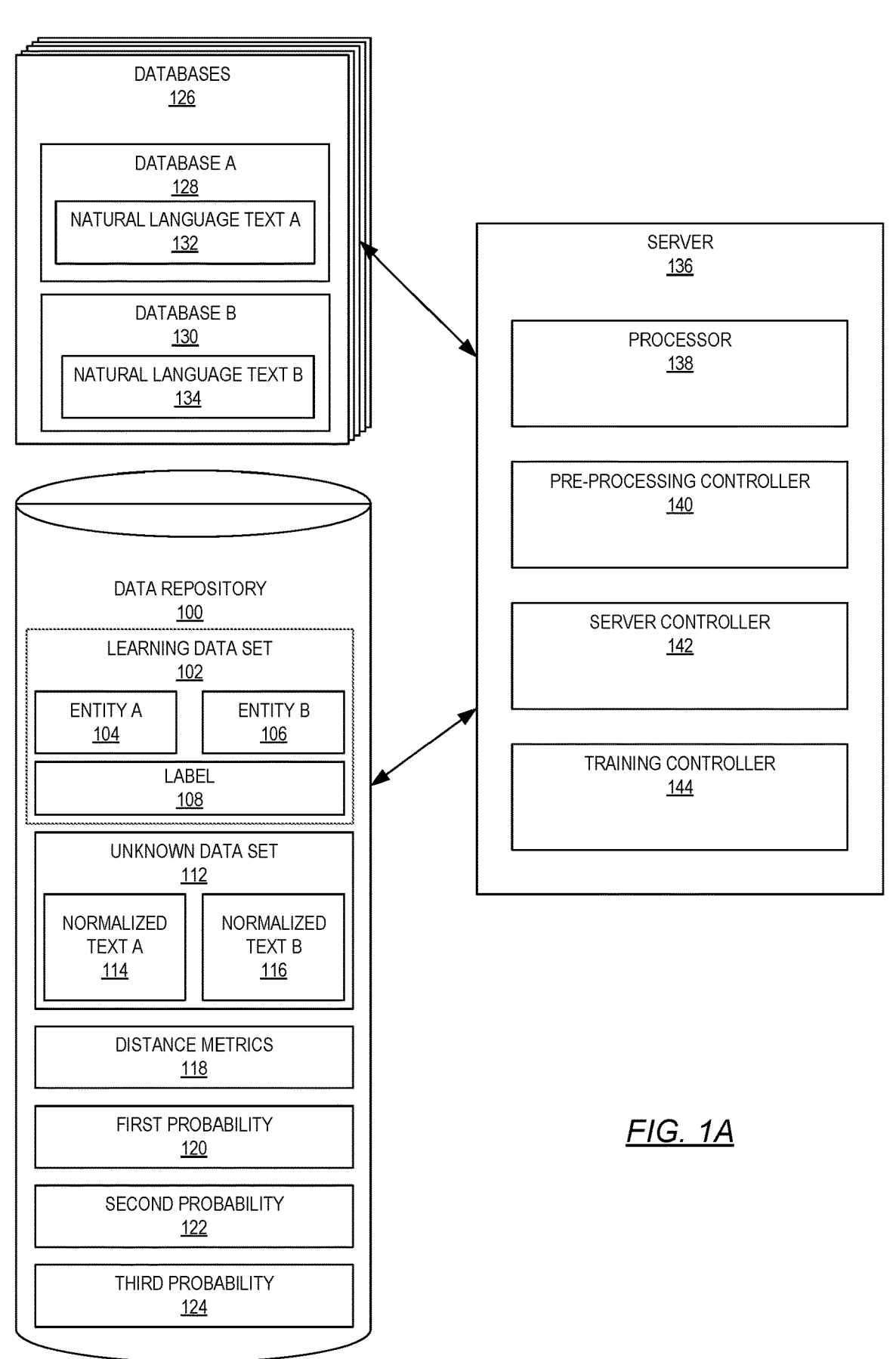
FIG. 1A, FIG. 1B, FIG. 1C, FIG. 1D, FIG. 1E, and FIG. 1F show a computing system, in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding of the one or more embodiments. However, it will be apparent to one of ordinary skill in the art that the one or more embodiments may be practiced without these specific details. In other instances, well-known features have not been described in detail to avoid unnecessarily complicating the description.

The one or more embodiments relate to machine learning technology. As used herein, machine learning refers to an algorithm that predicts, as output, a probability that an input matches a classification. The machine learning algorithm may be referred to as a machine learning model, a classifier, or simply 'a model'. The terms "system of machine learning models," "machine learning system," or "system of models," as used herein, refer to one or more machine learning models, possibly operating in concert.

In general, the one or more embodiments relate to a machine learning system that may be used to apply supervised machine learning to unsupervised text. While more detail is provided below, supervised learning refers to using machine learning algorithms trained on labeled data in order to classify new labeled data. Unsupervised learning refers to machine learning algorithms that are applied to unlabeled data sets. As used herein "unsupervised text" refers to text that is not initially labeled, and hence initially suitable for use with unsupervised machine learning systems, but not suitable for use with supervised machine learning systems.

The one or more embodiments represent a technique for overcoming an accuracy issue that can arise when classifying unsupervised text. Whereas unsupervised machine learning systems can classify the unsupervised text, the degree of classification accuracy may not be suitable for certain classification problems.

For example, consider the application of deduplicating text in two related databases. Both databases contain references to the same entities. However, the names of the entities may not exactly match. For example, entity "ABC" may be referred to as "ABC, Inc." in one database, but referred-to as "abc co." in the other database. While both names refer to the same entity, the identifiers do not match. A final list of entities that removes such duplications is desired, but a computer performing simple name matching will identify the subtle differences between the names and wrongly include both identifiers as different entities in the resulting final list.

Unsupervised learning alone may be, in some cases, not sufficiently accurate to deduplicate the text, as false positives and false negatives may occur. In the case of false negatives, two names are predicted not to match, even though the two names do match. Thus, both names remain in the final list of entities, even though undesirably the two names refer to the same entity. In the case of false positives, two names are predicted to match, even though the two names do not. Thus, two names that are similar are wrongly identified as matching the same entity. Accordingly, a distinct entity is wrongly removed from the final list of entities. False positives and false negatives in unsupervised text classification thus also may result in inaccuracies in the final list generated by automated deduplication.

The one or more embodiments avoid the above inaccuracies by using a system of multiple machine learning models that are trained on labeled data, but applied to unsupervised text. During a training phase, labels are assigned to a training data set by comparing other available details regarding an entity. For example, names, addresses, phone numbers, etc. may be used to determine whether two entities with similar names are the same entity, and then the labels may be assigned to entities. At least two of the systems of machine learning models are trained on the training data set.

After training the machine learning models of the machine learning systems, the machine learning systems are ready for deployment. When deployed to classify unknown data sets, first pre-processing is performed to normalize the data. Then, operating on the normalized data, two or more unsupervised machine learning systems generate separate probability outputs that any two instances of text match each other. The two or more outputs are provided to a metamodel, which is a supervised machine learning system. The output of the metamodel is the final probability that the two instances of text match each other. The final probability then may be used to determine whether some automated action should be obtained, such as for example whether to remove one of two names in an automated deduplication task.

Thus, the machine learning systems of the one or more embodiments enhances the accuracy of a computer when automatically classifying unsupervised text. In one non-limiting example, the deduplication application mentioned above, the improved machine learning systems limit false positives and false negatives when performing entity matching between two databases. As a result, the automatically generated deduplicated list of entities is more accurate than a similar list generated using solely an unsupervised machine learning system to classify the unsupervised text.

Attention is now turned to the figures. FIG. 1A, FIG. 1B, FIG. 1C, FIG. 1D, FIG. 1E, and FIG. 1F show a computing system, in accordance with one or more embodiments, and should be considered together. Referring to FIG. 1A, the computing system includes a data repository (100). In one or more embodiments, the data repository (100) is a storage unit and/or device (e.g., a file system, database, collection of tables, or any other storage mechanism) for storing data. Further, the data repository (100) may include multiple different storage units and/or devices. The multiple different storage units and/or devices may or may not be of the same type and may or may not be located at the same physical site.

The data repository (100) stores a training data set (102). The training data set (102) is a set of data that is used to train one or more machine learning models and machine learning systems controlled by the server controller (142) as described below. The training data set (102) may be obtained from data in the databases (126), also described below.

The training data set (102) includes multiple entities, such as entity A (104) and entity B (106). An entity is an identifier for an object, a process, a person, a business, or some other uniquely identifiable thing. For example, an entity may be a name of a person, a name of a business, a name of a process, an identifier for a datum obtained during an experiment, etc. In the one or more embodiments, entity A (104) is obtained from a first database (e.g., database A (128) described below) and entity B (106) is obtained from a second database (e.g., database B (130) described below).

Pairs of entities in the training data set (102) are assigned labels. Thus, in FIG. 1A, label (108) is assigned to the text couple represented by entity A (104) and entity B (106). A label is information that describes the entity. In the one or more embodiments, a label indicates whether the pair of entities match. For example, if the entity A (104) matches the entity B (106), then the label (108) may be represented by a value of "1." However, if the entity A (104) does not match the entity B (106), then the label (108) may be represented by a value of "0."

The data repository (100) may also store a unknown data set (112). The unknown data set (112) is the data set of interest on which data deduplication is to be performed. The unknown data set (112) is a set of data, possibly obtained from the databases (126) described below, that contains sets of unknown entities represented by text. An unknown entity is an entity for which that system does not have any record associated with the unknown entity of whether a matching entity in another database exists. Thus, while the names or identifiers of each individual entity in the two or more databases are known, what is unknown is whether one or more of a first set of entities in a first database matches one or more of a second set of entities in a second database.

As described further below with respect to FIG. 1C, the entities in the unknown data set (112) may undergo data normalization in order to form normalized data. Normalized data is text representing an identifier of an entity, but which has had certain characters removed from, or added to, the text.

Each instance of normalized text represents an entity. Thus, for example, the normalized text A (114) represents a first entity in the unknown data set (112), and the normalized text B (116) represents a second entity in the unknown data set (112).

The data repository (100) also stores other information. For example, the data repository (100) stores one or more distance metrics (118). A distance metric is a number representing the degree to which two words or phrases are related to each other, as evaluated by some algorithm Examples of distance metric evaluations are described with respect to FIG. 1C.

The data repository (100) also stores a number of probabilities. Each probability represents an output of a machine learning system. Specifically, each probability represents the probability, as evaluated by a given machine learning system, that two similar text phrases refer to the same entity. Thus, the first probability (120) represents the probability that a given pair of words or phrases refer to the same entity, as evaluated by a first machine learning system. Similarly, the second probability (122) represents the probability that a given pair of words or phrases refer to the same entity, as evaluated by a second machine learning system. Likewise, the third probability (124) represents the probability that a given pair of words or phrases refer to the same entity, as evaluated by a third machine learning system. In the one or more embodiments, the first probability (120), the second probability (122), and the third probability (124) are evaluated for each pair of words or phrases, as described further with respect to FIG. 2A.

The system shown in FIG. 1A may include other components. For example, the system of FIG. 1A may include two or more databases (126), such as, for example, database A (128) and database B (130). Each database is a repository of data, or a data structure that holds data. Each of the databases (126) contain sets of natural language text that identify multiple entities. Thus, for example, the database A (128) includes natural language text A (132), which serves as a first identifier for a first entity. However, the database B (130) includes natural language text B (134), serves as a second identifier for a second entity.

In the one or more embodiments, the first identifier is different than the second identifier. Thus, natural language text A (132) and natural language text B (134) do not match identically. However, it is initially unknown to the system whether the first entity and the second entity are actually the same entity. It is possible that, while the natural language text A (132) does not match the natural language text B (134), the entity referred to in the two different databases is the same entity. To refer to the above example, the natural language text A (132) may be the text string "ABC" and the natural language text B (134) may be the text string "abc co." While the two text strings are different, it is initially unknown whether the two text strings actually refer to the same entity, which may possibly have an entirely different proper name (e.g., ABC, Inc.) The one or more embodiments address the machine learning classification task of determining accurately whether the natural language text A (132) and the natural language text B (134) refer to the same entity.

The system shown in FIG. 1A also includes a server (136). The server (136) is one or more computers, possibly remote and communicating over a network, such as the data processing system and network environment shown in FIG. 6A and FIG. 6B. The server (136) includes one or more processors represented by the processor (138). The processor (138) is hardware or a virtual machine able to execute one or more controllers, such as the pre-processing controller (140), the server controller (142), and the training controller (144).

The pre-processing controller (140) is software and/or application specific hardware that is programmed to perform pre-processing of the natural language text in the databases (126). The operations of the pre-processing controller (140) are described with respect to FIG. 1B.

The server controller (142) is software and/or application specific hardware that is programmed to control operation of the machine learning systems described herein. The overall operation of the server controller (142) is described with respect to FIG. 1C. Two of the machine learning systems are described with respect to FIG. 1D and FIG. 1E, and are controlled by the server controller (142). The third machine learning system is described below.

Figure 1B:
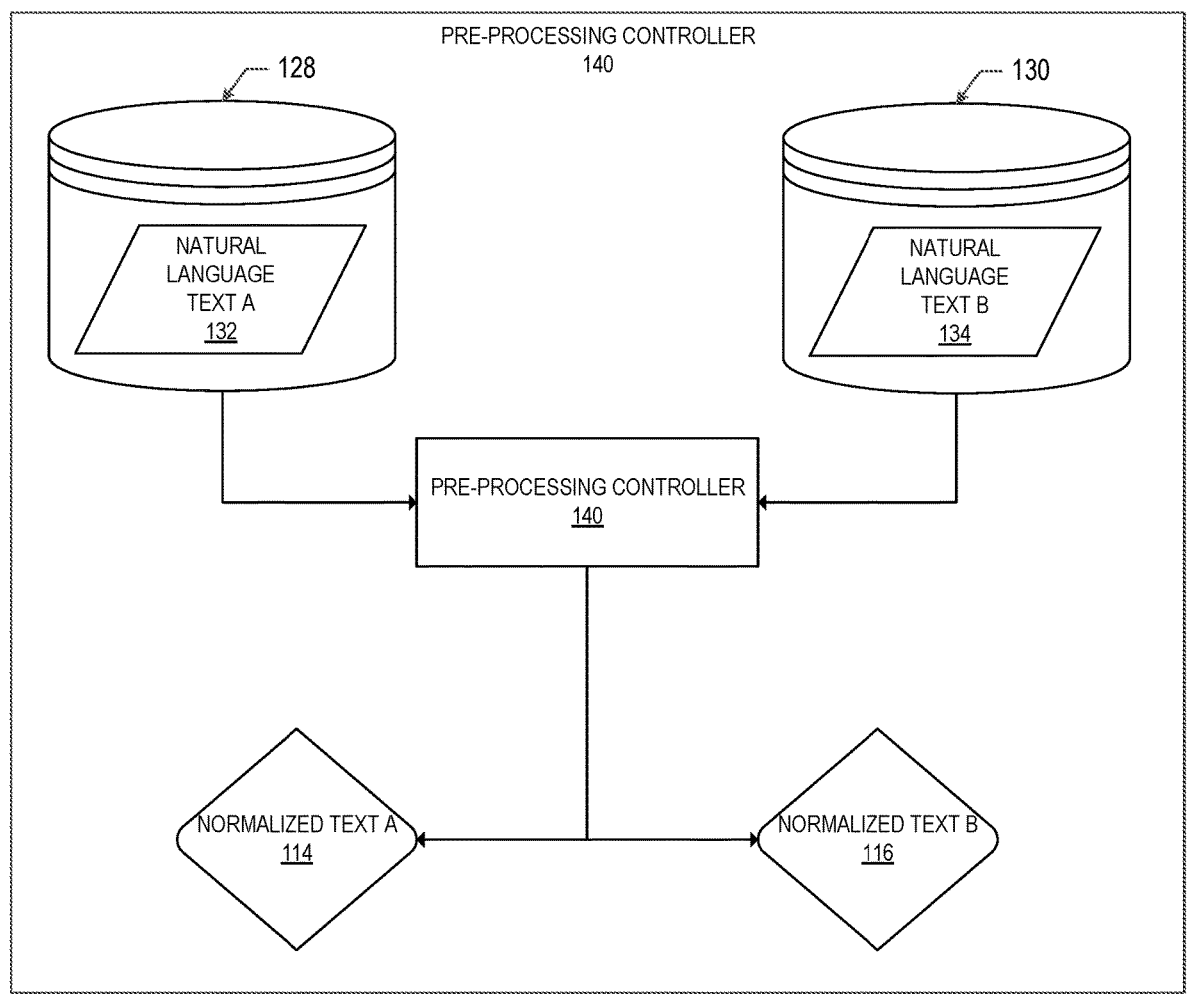
Figure 1C:
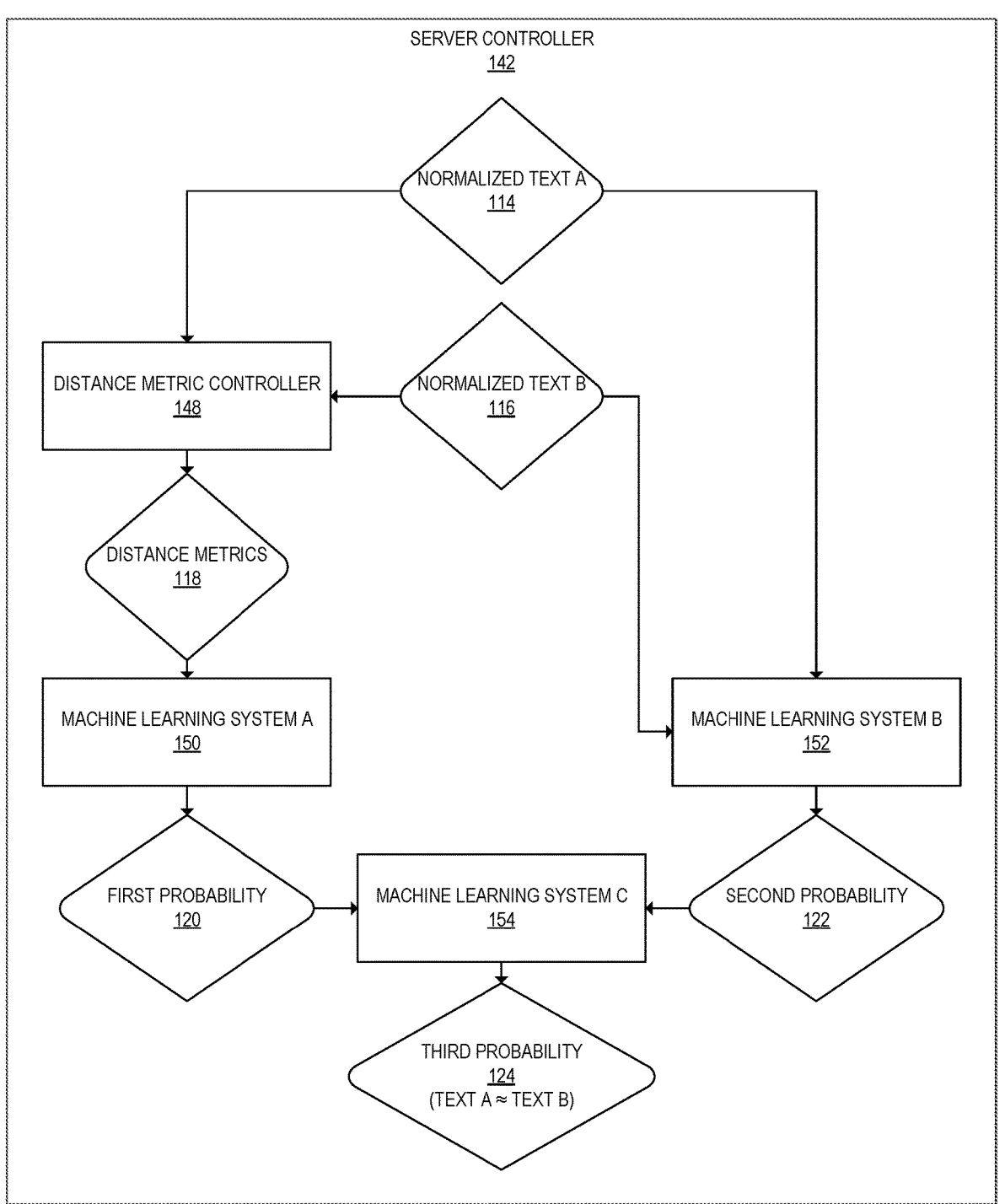
Figure 1D:
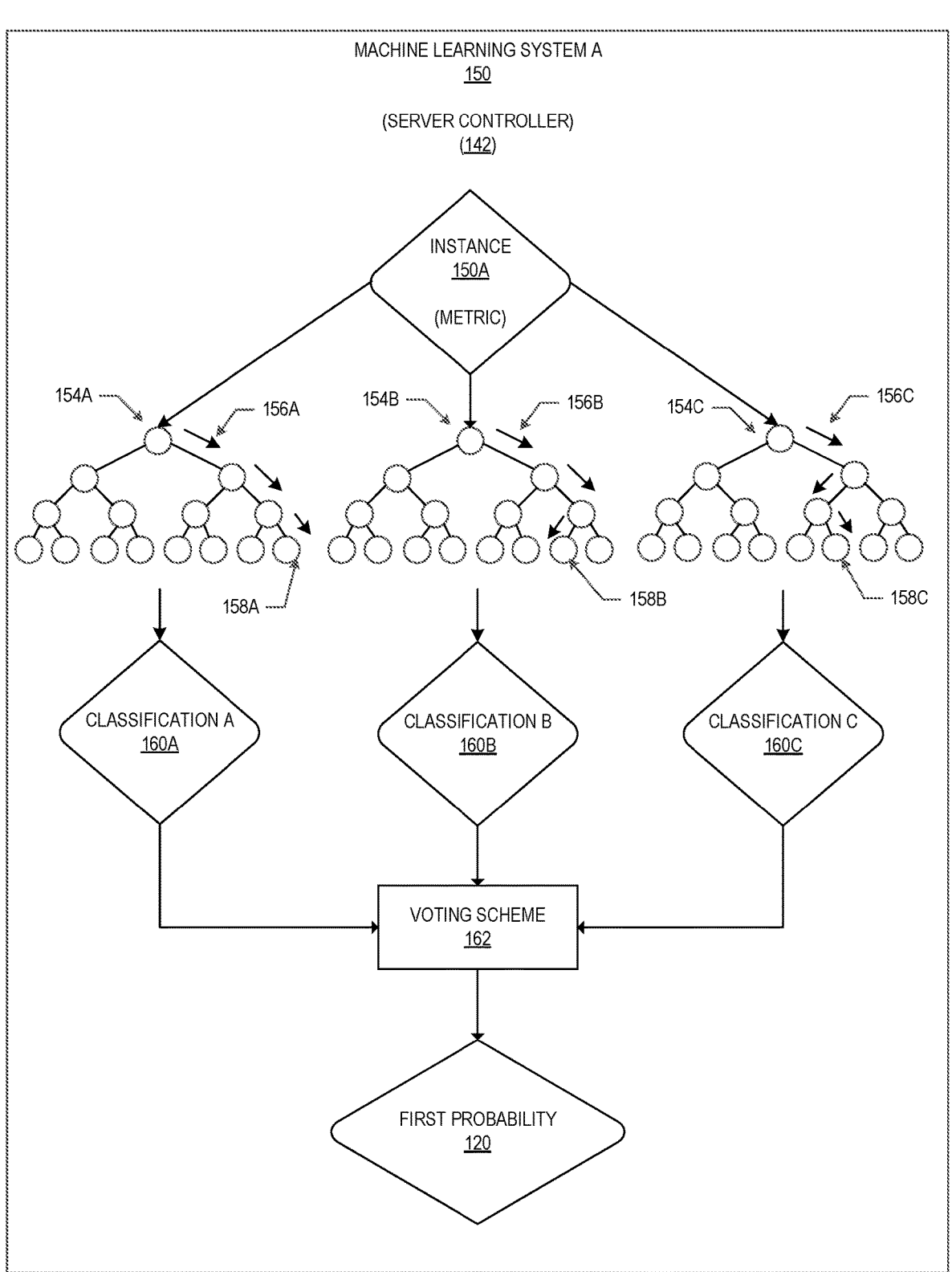
Figure 1E:
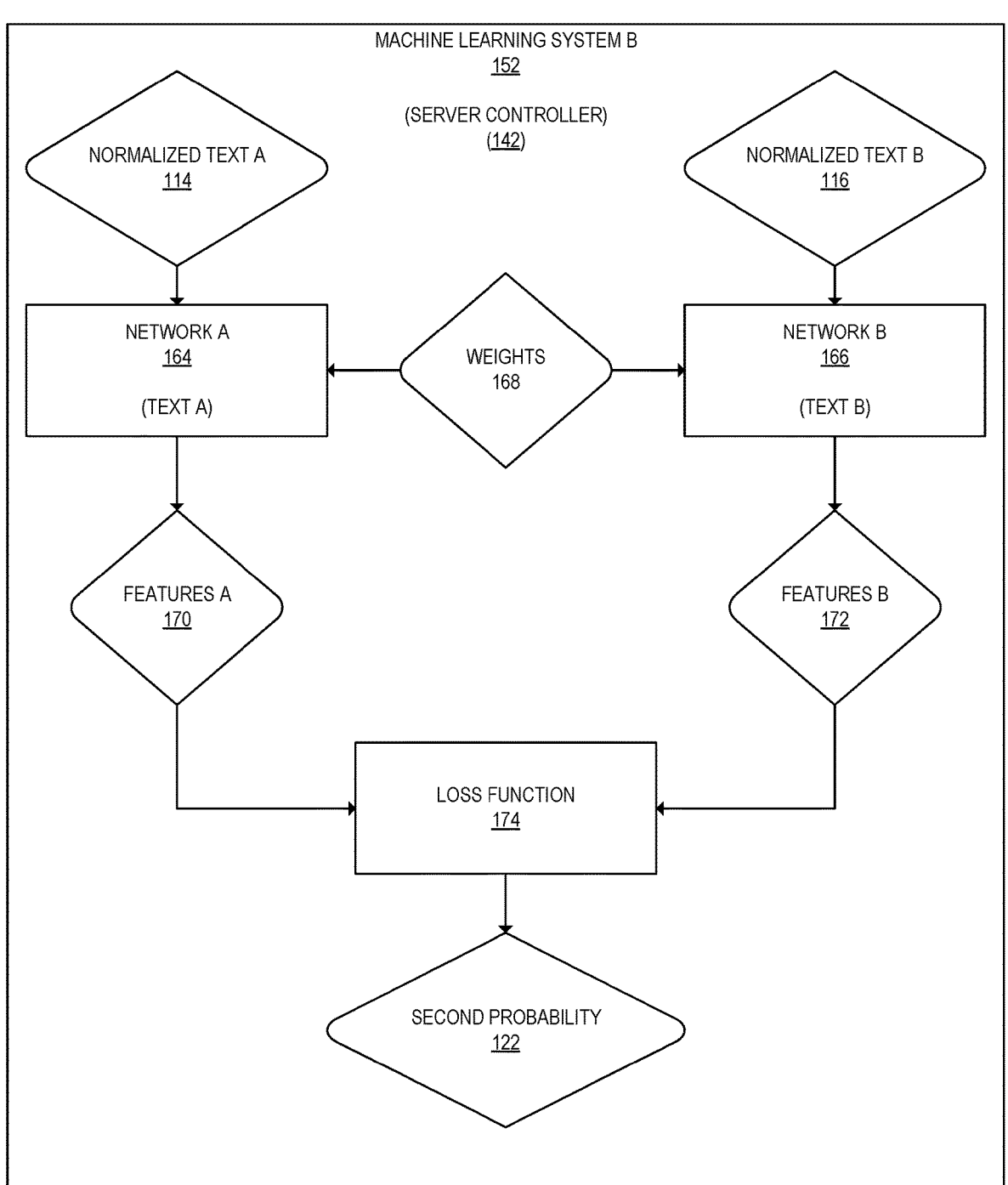

The training controller (144) is software and/or application specific hardware that is programmed to train the one or more machine learning systems described with respect to FIG. 1C, FIG. 1D, and FIG. 1E. The training controller (144) is described in more detail with respect to FIG. 1F.

Attention is now turned to FIG. 1B through FIG. 1F, which show details of some aspects of the system shown in FIG. 1A. For example, FIG. 1B shows details of the pre-processing controller (140). The database A (128) contains natural language text A (132), but is also assumed to contain many other instances of natural language text. The natural language text A (132) refers to, or is an identifier of, an entity. Similarly, the database B (130) contains natural language text B (134), but is also assumed to contain many other instances of natural language text. The natural language text B (134) refers to, or is an identifier of, an entity. However, unless referring to a training data set, initially it is unknown whether the natural language text A (132) and the natural language text B (134) refer to the same entity or to different entities.

Each instance of natural language text, including the natural language text A (132) and the natural language text B (134), are provided as input to a pre-processing controller (140). The pre-processing controller (140) is software and/or application specific hardware programmed to normalize the natural language text. The process of normalization is described with respect to FIG. 2A. The pre-processing controller (140) may be programmed to perform other manipulations on the natural language text prior to further analysis, as designated by a computer programmer.

The output of the pre-processing controller (140) is normalized text. In particular, each instance of normalized text corresponds to each input instance of natural language text. Thus, for example, one input of the pre-processing controller (140) may be the natural language text A (132), and the corresponding output is the normalized text A (114). Similarly, when the input to the pre-processing controller (140) is the natural language text B (134), then the output is the normalized text B (116).

Attention is now turned to FIG. 1C, which shows details of the server controller (142). Again, the server controller (142) is software and/or application specific hardware that contains multiple applications, as described below.

The input to the server controller (142) is the normalized text, which therefore may be the output of the pre-processing controller (140) of FIG. 1A and FIG. 1B. The normalized text serves as input to at least two software applications. In the example of FIG. 1C, the normalized text A (114) and the normalized text B (116) are provided as input to both the distance metric controller (148) and the machine learning system B (152).

The distance metric controller (148) is software and/or application specific hardware programmed to calculate a distances between pairs of text. Thus, for example, the distance metric controller (148) may calculate a distance between the normalized text A (114) and the normalized text B (116).

The distance is a numerical value that represents a space between a pair of text words or phrases, relative to a scale determined by the method used to determine the distance. The distance between the normalized words may include several metrics, a number of changes, a contextual distance, a number of common characters, and a phonetic distance. In the one or more embodiments, multiple distance measuring techniques may be used, and their results combined to generate a final distance between the normalized text A (114) and the normalized text B (116). In one example, a logistic regression model may be used to generate the distances between pairs of text words or phrases.

The output of the distance metric controller (148) is the distance metric (118). The distance metric (118) will be used later as input to the machine learning system A (150), as described below. The machine learning system A (150) is an example of a first machine learning system, and includes one or more machine learning models.

Returning to the initial input of the normalized text A (114) and the normalized text B (116), the two instances of normalized text serve as a pair of terms that are provided as input to the machine learning system B (152). The machine learning system B (152) is one or more machine learning models trained to take as input the text pair and produce as output a probability that the text pair matches each other. In particular, the output of the machine learning system B (152) is the second probability (122) referenced in FIG. 1A.

An example of the machine learning system B (152), and its operating characteristics, are shown in FIG. 1E. However, the machine learning system B (152) may be a different machine learning model or may be multiple additional machine learning models relative to the machine learning system shown in FIG. 1E. The machine learning system B (152) is an example of a second machine learning system.

Continuing with FIG. 1C, the first probability (120) and the second probability (122) serve as inputs to the machine learning system C (154). The machine learning system C (154) is one or more machine learning models which are programmed to obtain, as input, the two probabilities and generate, as output, the third probability (124). Again, the third probability (124) is the final probability that normalized text A (114) and normalized text B (116) are associated with the same entity. The machine learning system C (154) may be a supervised machine learning model, such as a logistic regression model, but may take the form of one or more other models, possibly working in concert with each other. A logistic regression is a statistical model that, in its basic form, uses a logistic function to model a binary dependent variable, although many more complex extensions exist.

Attention is now turned to FIG. 1D, which shows the details of the machine learning system A (150), mentioned above in FIG. 1C, which is part of the server controller (142), mentioned in FIG. 1A. In particular, the machine learning system A (150) is a random forest machine learning model, though one or more different machine learning model types may be used, possibly in concert with each other.

A random forest machine learning model is an ensemble learning method, which may be used for classification, as described herein. The random forest model includes a multitude of decision trees at training time. For classification tasks, the output of the random forest is the class selected by most trees. While a random forest machine learning model may be an unsupervised machine learning system, if labeled data is available, then in the one or more embodiments the machine learning system A (150) may be a supervised machine learning system in order to take advantage of the accuracy gained by training the machine learning system A (150) on labeled data.

In the random forest model shown in FIG. 1D, the input is an instance (150A). In the one or more embodiments, the instance (150A) is a particular metric for determining the distance between a pair of text words or phrases being evaluated for possibly being associated with a single entity.

The instance (150A) serves as an input for each of the decision trees in the machine learning model. For clarity, only three decision trees are shown in FIG. 1D: decision tree A (154A), decision tree B (154B), and decision tree C (154C). Each decision tree is composed of a series of decisions in the form of a binary output (e.g., "yes" or "no", "1" or "0", "above threshold" or "below threshold," etc." Thus, each bubble in each of the decision tree A (154A), decision tree B (154B), and decision tree C (154C) is a decision. Thus, like a flowchart, different paths, represented by arrows (156A), arrows (156B), and arrows (156C) can be obtained down the decision trees before arriving at a final answer, represented by an end leaf node (e.g., end leaf node (158A) for decision tree A (154A), end leaf node (158B) for decision tree B (154B), and end leaf node (158C) for decision tree C (154C)). Each leaf node at the bottom of the tree represents a different possible answer for classifying the instance (150A) (e.g., whether the metric input should be classified as the text pair being referring to the same entity, or not). Accordingly, the leaf nodes are arranged in pairs, representing "yes" (e.g., the pair of text phrases or words relate to the same entity) or "no" (e.g., the pair of text phrases or words relate to different entities).

Because the different decision trees may ask different questions, or ask the questions in a different order, the output of each decision tree might possibly be different than the output of another decision tree. Thus, many classifications result, one per decision tree. In the example of FIG. 1D, three classifications exist, classification A (160A), classification B (160B), and classification C (160C).

In order that the machine learning system A (150) output a single classification decision, a voting scheme (162) may be used. The voting scheme (162) is software and/or application specific hardware that obtains, as input, the classifications of the various decision trees and produces, as output, a single classification. The voting scheme may take different forms, such as, for example, a simple voting scheme where the most common classification is the first probability (120). For example, if more of the decision trees came to a determination of "yes", than "no," using the above example, then the first probability (120) would be a classification that the instance (150A) represents a text phrase or word pair that correlate to the same entity.

However, the voting scheme (162) may be some other scheme. For example, the fact that more or fewer "no" decisions may be used to generate a probability reflecting the certainty of the final "yes" decision. Continuing the example, the number of "no" decisions could reduce the probability of the "yes" decision below 100%, so that the first probability (120) is a number between 0.50 and 1.0 and indicates the likelihood of the "yes" answer. Furthermore, the weights of the various classifications may be altered, such as for example when a programmer believes that decision tree A (154A) is more likely to reach a trustworthy answer than the decision tree C (154C). In this case, the classification A (160A) may be assigned a greater weight than the classification C (160C) in the voting scheme (162). Thus, many variations are possible for the voting scheme (162).

In any case, as indicated above, the output of the voting scheme (162) is the first probability (120). The first probability (120), in turn, is used as one of the inputs to the decision tree C (154C), shown in FIG. 1C.

In an example, the random forest model may have the following settings. Maximum features=0.25; minimum samples leaf=1, minimum samples split=4, "n" estimators=100. However, many other settings may be used.

Attention is now turned to FIG. 1E. FIG. 1E shows the details of the machine learning system B (152) shown in FIG. 1B, which is part of the server controller (142). The machine learning system B (152) in the example of FIG. 1E is an example of a Siamese unsupervised machine learning system, which involves two separate but identical machine learning models. In particular, the machine learning system B (152) may include two long short term memory (LSTM) networks, or other recurrent neural networks (RNNs). Thus, the machine learning system B (152) may be referred-to as a Siamese long short term memory network. The machine learning system B (152), and/or the individual networks within the machine learning system B (152), however, may take the form of one or more additional machine learning systems.

In the example of FIG. 1E, the normalized text A (114) is provided as input to network A (164). The network A (164) in this example is a LSTM network, which is a type of recurrent neural network.

The normalized text B (116) is provided as input to the network B (166). The network B (166) in this example is also a LSTM network.

The network A (164) and the network B (166) are identical. Thus, for example, the network A (164) and the network B (166) share the same weights (168) and have the same programming. However, the input is different between the two networks; namely, the network A (164) receives the normalized text A (114) and the network B (166) receives the normalized text B (116).

The output of the networks are sets of features. Thus, the output of the network A (164) is the features A (170), and the output of the network B (166) is the features B (172). The features are predictions for different aspects or portions of the input. For example, in an unrelated example, if an LSTM network were used to create a caption describing an image, the output of the LSTM network might be a multiple words describing multiple sections of the image. In the one or more embodiments, the features may be one or more distances between words or word pairs in the input.

The features (i.e., the features A (170) and the features B (172)) are provided as input to a loss function (174). The loss function (174) is software and/or application specific hardware that determines a difference between the two features in order to evaluate how closely the normalized text A (114)

and the normalized text B (116) match. In the one or more embodiments, the contrastive loss function may be defined as:

$$\text{loss}(d, Y) = \frac{1}{2} * Y * d^2 + (1 - Y) * \frac{1}{2} * \max(0, m - d)^2$$

where "d" is the distance of the outputs of the encoder, "Y" is the label of the model inputs (e.g., 1 if the two instances of normalized text are similar, and 0 if dissimilar), and "m" is the margin parameter. The margin parameter defines a radius around the embedding space of a sample so that dissimilar pairs of samples only contribute to the contrastive loss function if the distance is within the margin. In some embodiments, the margin parameter may be set to a value of "1." The "loss(d,Y)" is the loss value, which is used as the second probability (122) that is provided as input to the machine learning system C (154), as shown in FIG. 1C.

In an example, the following details of the Siamese LSTM system may be used. The embedding dimensions=300, dropout keep probability=0.8, hidden units=50, batch size=64, number of epochs=300, evaluate the model on dev set after the number of steps=1000, and maximum document length=15. The layers of each model may include character embedding, a convolutional layer, a bidirectional LSTM layer, a Euclidean distance layer, and a contrastive loss on Euclidean distance layer.

Figure 1F:
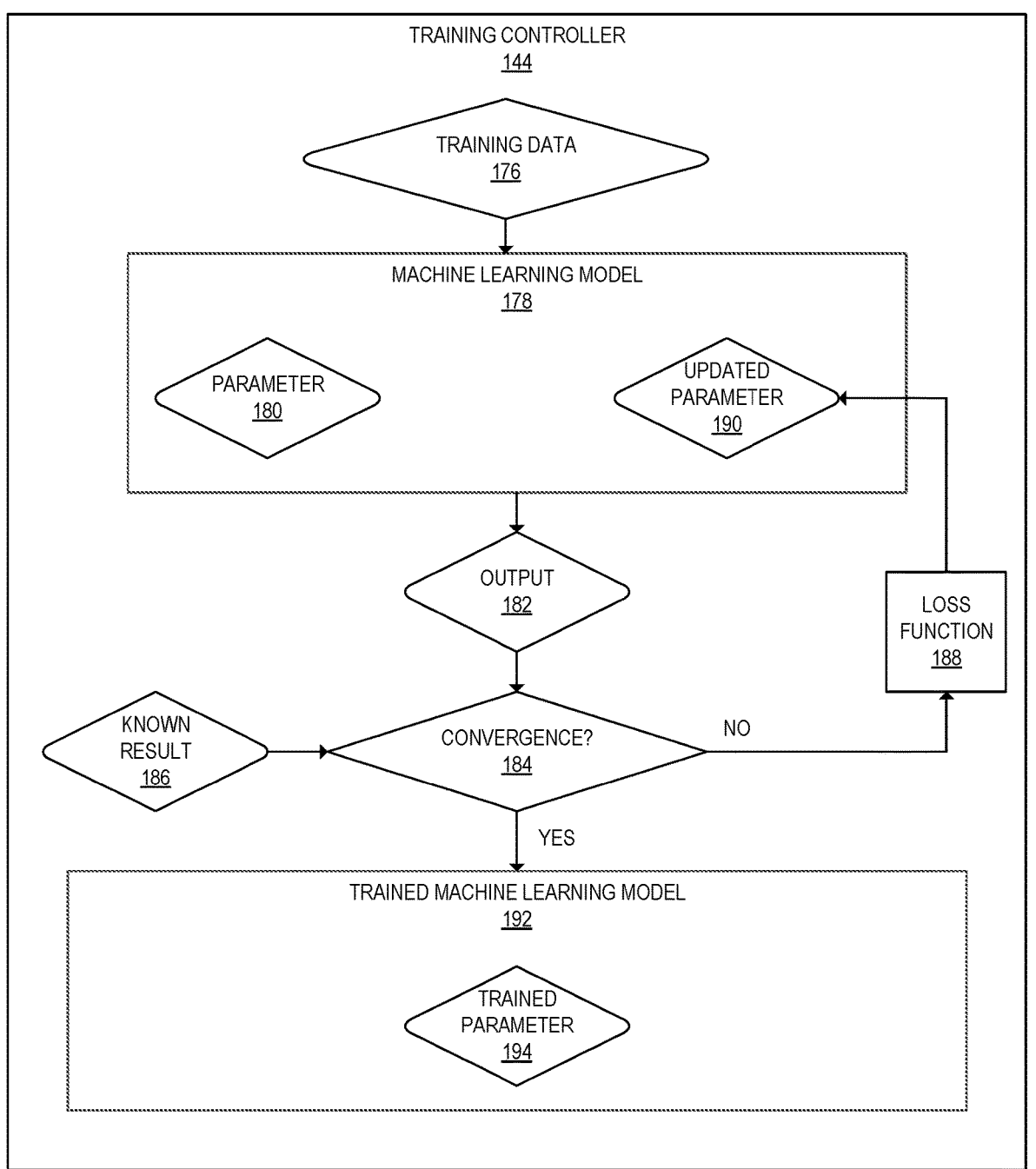

Attention is turned to FIG. 1F, which shows the details of the training controller (144). The training controller (144) is a training procedure that may be used to train one or more the machine learning systems described with respect to FIG. 1A through FIG. 1E.

In general, machine learning models are trained prior to being deployed. The process of training a model, briefly, involves iteratively testing a model against test data for which the final result is known, comparing the test results against the known result, and using the comparison to adjust the model. The process is repeated until the results do not improve more than some predetermined amount, or until some other termination condition occurs. After training, the final adjusted model (i.e., the trained machine learning model (192)) is applied to the unknown data in order to make predictions.

In more detail, training starts with training data (176), which may be the training data set (102) described with respect to FIG. 1A. A correct final result is related to each item of training data. For example, the training data may be pre-labeled by a user. For example, if the machine learning task is to identify whether two names refer to the same entity, then a stored relationship exists between the two names. The stored relationship indicates that the two names refer to the same entity.

The training data (176) is provided as input to the machine learning model (178). The machine learning model (178), as described before, is an algorithm. However, the output of the algorithm may be changed by changing one or more parameters of the algorithm, such as the parameter (180) of the machine learning model (178). The parameter (180) may be one or more weights, the application of a sigmoid function, a hyperparameter, or possibly many different variations that may be used to adjust the output of the function of the machine learning model (178).

An initial value is set for the parameter (180). The machine learning model (178) is then executed on the training data (176). The result is a output (182), which is a prediction, a classification, a value, or some other output which the machine learning model (178) has been programmed to output.

The output (182) is provided to a convergence process (184). The convergence process (184) compares the output (182) to the known result (186). A determination is made whether the output (182) matches the known result (186) to a pre-determined degree. The pre-determined degree may be an exact match, a match to within a pre-specified percentage, or some other metric for evaluating how closely the output (182) matches the known result (186). Convergence occurs when the known result (186) matches the output (182) to within the pre-determined degree.

If convergence has not occurred (a "no" at the convergence process (184)), then a loss function (188) is generated. The loss function (188) is a program which adjusts the parameter (180) in order to generate a updated parameter (190). The basis for performing the adjustment is defined by the program that makes up the loss function (188), but may be a scheme which attempts to guess how the parameter (180) may be changed so that the next execution of the training data (176) with the updated parameter (190) will have a output (182) that more closely matches the known result (186).

In any case, the loss function (188) is used to specify the updated parameter (190). As indicated, the machine learning model (178) is executed again on the training data (176), this time with the updated parameter (190), and the process iterates. The process continues to iterate until convergence.

Upon convergence (a "yes" result at the convergence process (184)), the machine learning model (178) is deemed to be a trained machine learning model (192). The trained machine learning model (192) has a final set of parameters, represented by the trained parameter (194) in FIG. 1F.

During deployment, the trained machine learning model (192) with the trained parameter (194) is executed again, but this time on unknown data for which the final result is not known. The output of the trained machine learning model (192) is then treated as a prediction of the information of interest relative to the unknown data.

While FIG. 1A through FIG. 1F show a configuration of components, other configurations may be used without departing from the scope of the one or more embodiments. For example, various components may be combined to create a single component. As another example, the functionality performed by a single component may be performed by two or more components.

Figure 2A:
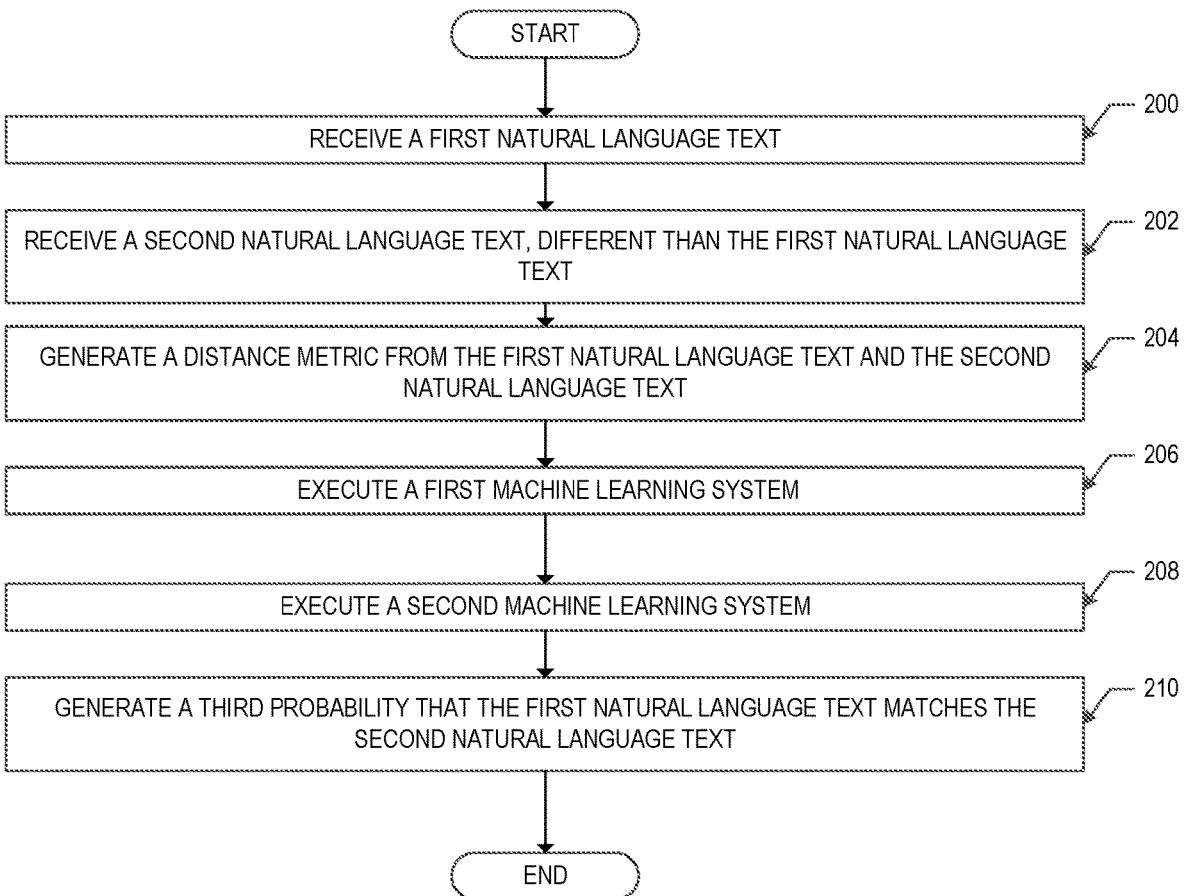
FIG. 2A and FIG. 2B show flowcharts of a supervised machine learning method for matching unsupervised data, in accordance with one or more embodiments.
Figure 2B:
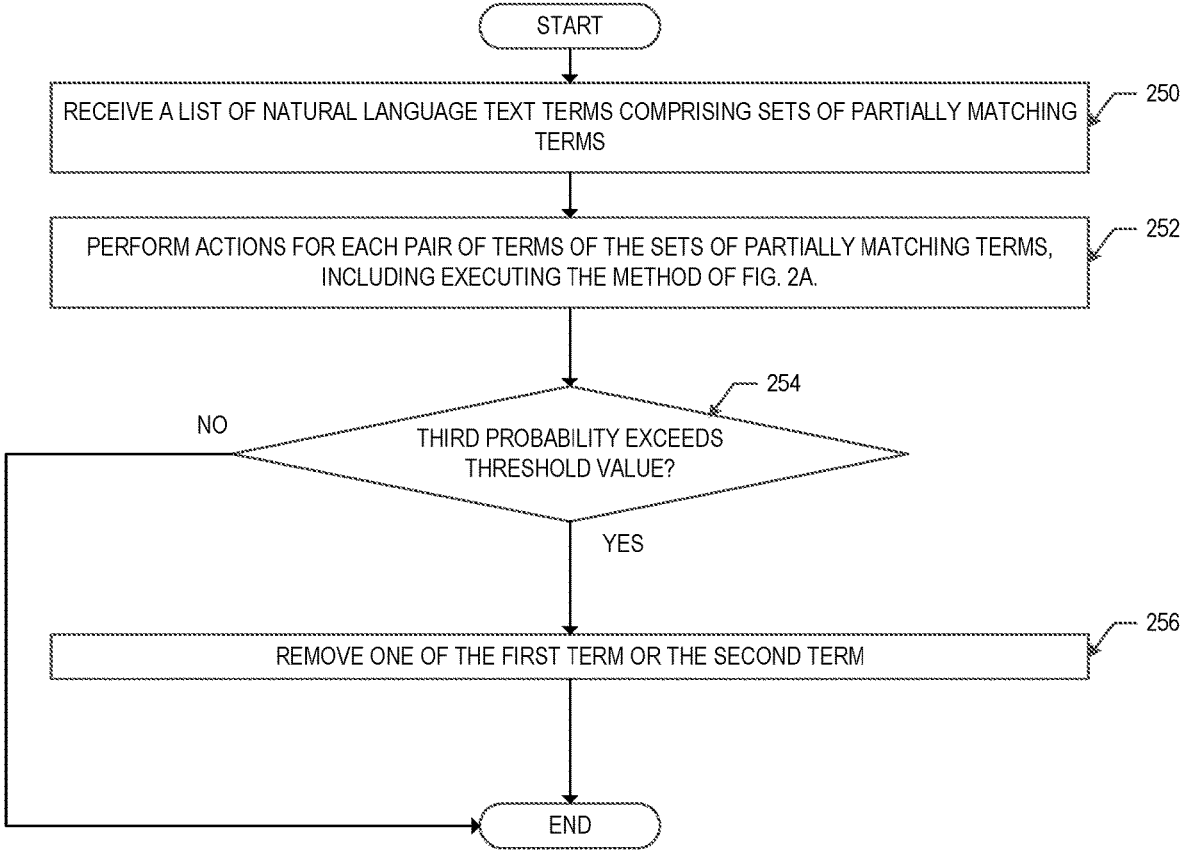

FIG. 2A and FIG. 2B are flowcharts, in accordance with one or more embodiments. The methods of FIG. 2A and FIG. 2B may be executed using the system shown in FIG. 1A through FIG. 1E. The machine learning models used to perform the methods of FIG. 2A and FIG. 2B may be trained using the training process described with respect to FIG. 1F.

FIG. 2A is a machine learning method of determining whether a first instance of natural language text matches a second instance of natural language text. For example, if the two instances match within a predetermined degree, then it may be determined that the two instances of text refer to the same entity.

Step 200 includes receiving a first natural language text. The first natural language text may be received by the server controller retrieving the text from a remote database, by the server controller accessing a local database, or having the text transmitted to the server controller. Similarly, Step 202 includes receiving a second natural language text, different than the first natural language text. The second natural language text is retrieved in a similar manner as the first natural language text.

Step 204 includes generating a distance metric from the first natural language text and the second natural language text. The distance metric may be generated using one or more of a number of different distance metric calculation schemes. Examples of distance metric evaluation schemes include, but are not limited to, iterative substring, token set ratio, "LCCSTR," partial ratio, "STRCMP95," discounted Levenshtein, Jaro, Flexmetric, Prefix, Bisim, Phonetic Edit Distance, Token Sort Ratio, Editex, Sift4, "Pshp_soundex-_first," Saps, "MRA," "MLIPNS," and combinations thereof.

The different distance metric schemes may be based on measuring different properties of the text. For example, one scheme may focus on phonetical similarities between words. Another scheme may focus on character positioning within text. For example, a scheme may assign words a location on a graph based on phonetics or character positioning or word definition, and then measure distances on the graph between pairs of words.

Any one distance metric scheme may be used to generate a distance metric. Additionally, the outputs of multiple schemes may be combined by averaging or weighted averaging, such as by weighting an output according to an impact on model output or feature value.

Step 206 includes executing a first machine learning system. The first machine learning system may be the machine learning system A (150) in FIG. 1C. The first machine learning system obtains, as a first input, the distance metric and generating, as a first output, a first probability that the first natural language text matches the second natural language text. An example of the operation of the first machine learning system is shown with respect to FIG. 1D (e.g., machine learning system A (150)).

Step 208 includes executing a second machine learning system. The second machine learning system may be the machine learning system B (152) in FIG. 1C. The second machine learning system obtains as a second input the first natural language text and as a third input the second natural language text, and generating, as a second output, a second probability that the first natural language text matches the second natural language text. An example of the operation of the second machine learning system is shown with respect to FIG. 1E.

Step 210 includes generating a third probability that the first natural language text matches the second natural language text. The third probability may be generated by combining the first probability and the second probability. Combining may include processing the first and second probabilities as input to a metamodel, such as a logistic regression model or some other supervised machine learning system. Combining may also include averaging, or using a weighted average, of the first and second probabilities. In one embodiment, the method of FIG. 2A may terminate thereafter.

The method of FIG. 2A effectively allows a supervised machine learning system (i.e., the metamodel used at step 210) to be applied to unsupervised text. The first and second machine learning systems separately predict probabilities that text pairs relate to the same entities. Because the first and second machine learning systems are unsupervised systems, they are able to generate the predictions using unsupervised text as input. However, the metamodel may be a supervised machine learning system, because the outputs of the unsupervised systems are labeled. By combining the results of multiple unsupervised systems using a supervised system, the overall accuracy of the prediction (that any two pairs of text relate to the same entity) improves.

The method of FIG. 2A may be modified by adding steps or modifying steps. For example, the method may add one or more pre-processing steps before step 200. Specifically, the method may include pre-processing the first natural language text and the second natural language text prior to generating the distance metric, executing the first machine learning system, or executing the second machine learning system. Pre-processing may include normalizing the first natural language text and the second natural language text.

Normalizing the text refers to removing certain characters and/or changing a form of the characters in order to make future processing more efficient and/or accurate. Normalizing may include removing special characters (e.g., "*", "!", "$," etc.), removing generic terms (e.g., the word "the", the word "a", prepositions, "Inc.", etc.), removing numbers (e.g., the number "1", etc.), removing portions of addresses (e.g., "street", "road", "avenue," etc.), replacing upper case characters with lower case characters, replacing abbreviations with full words or vice versa (e.g., replacing "Inc." with "incorporated," or "limited liability company" with "LLC", etc.), and combinations thereof.

In another variation of the method of FIG. 2A, the method may include training one or more of the machine learning systems (i.e., any of the first or second machine learning systems and the metamodel that generates the third probability). Specifically, first and second natural language texts are, in this example, obtained from training data for which results are known. Training may begin by labeling the first natural language text and the second natural language text as a labeled text couple. Then, at least one of the first machine learning system and the second machine learning system are trained using the labeled text couple.

The process of training is described with respect to FIG. 1F. However, in this example, the known result is whether any given text pair relates to the same entity. The loss function recognizes whether the predicted probability matches the known result. Across many such predictions, the overall accuracy of the machine learning model may be evaluated. If the accuracy of the machine learning model has not reached a threshold value that indicates convergence, then the weights or other parameters of the machine learning model may be adjusted. The training process then iterates until convergence is achieved.

The method of FIG. 2A may also include sub-methods. For example, assume that the first machine learning system is a random forest machine learning model having a plurality of random forests. The random forest machine learning system is a supervised machine learning system and further obtains, as additional input, a first label associated with the first prediction and a second label associated with the second prediction. In this case, step 206 may include a sub-step to perform a number of classifications, including one classification for each of the random forests. Step 206 may also include a sub-step to perform a majority voting process on the plurality of classifications. Step 206 may also include a sub-step to output a final classification from the majority voting process.

In another example, assume that the second mom is a Siamese LSTM network. In this case, step 208 may include a sub-step to receive the first natural language text at the first LSTM network. Step 208 also may include a sub-step to receive the second natural language text at the second LSTM network. In either case, retrieving may be performed as described with respect to Step 200. Step 208 also may include a sub-step to generate a first sub-output by the first LSTM network. Step 208 also may include a sub-step to generate a second sub-output by the second LSTM network. The two outputs are generated by executing the LSTM networks on their individual inputs. Step 208 also may include a sub-step to evaluate a loss function between the first sub-output and the second sub-output. The loss function may be evaluated as described above with respect to FIG. 1E. Step 208 also may include a sub-step to generate the second output from the loss function, also performed as described with respect to FIG. 1E.

The method of FIG. 2A may also include implementing, automatically, a computer instruction responsive to the third probability exceeding a threshold value. For example, the computer instruction may be to delete one or more of the natural language text words or phrases, as being a duplicative reference to an entity. The computer instruction may include other instructions, such as to continue processing after a final list of entities has been generated, such as described with respect to FIG. 4.

Attention is now turned to FIG. 2B. FIG. 2B is a method of deduplicating text. The method of FIG. 2B is an application of the method of 2A, and thus may also be performed using the system of FIG. 1A through FIG. 1E. In this example, the server controller (142) may include one or more applications that execute the deduplication instructions.

Step 250 includes receiving a list of natural language text terms comprising sets of partially matching terms. The natural language terms may be received as described above with respects to steps 200 and 202 of FIG. 2A. The partially matching terms are terms that relate to the same entity, but which do not exactly match each other.

Step 252 includes performing actions for each pair of terms of the sets of partially matching terms. The actions may be the steps of FIG. 2A. In summary, then actions may be generating a distance metric from a pair of terms. The actions then include executing a first machine learning system, the first machine learning system taking, as a first input, the distance metric and generating, as a first output, a first probability that the pair of terms match each other. The actions then include executing a second machine learning system, the second machine learning system taking as a second input a first term of the pair of terms and as a third input a second term of the pair of terms, and generating, as a second output, a second probability that the pair of terms match each other. The actions then include generating a third probability that the pair of terms match each other, wherein identifying comprises combining the first probability and the second probability.

Step 254 includes evaluating whether the third probability (i.e., the probability that the first text and second text of a text pair relate to the same entity) exceeds a threshold value. The threshold value may be pre-selected by a computer scientist or by some external process. For example, the threshold value may be set to 95%, 90%, or some other value. In other words, in another example, if the third probability that a text pair relate to the same entity exceeds 89% (the threshold value), then the answer to step 254 would be "yes."

If the third probability does not exceed the threshold (a "no" determination at step 254), then the process terminates. In this case, both terms of the text pair (i.e., the first text and second text) are retained in the list of terms.

If the third probability does exceed the threshold (a "yes" determination at step 254), then at step 256, one of the first term or the second term is removed from the list. For example, a delete command may be issued to delete one of the names from the list.

The determination of which of the two text instances to delete may be performed by a variety of methods. For example, the method of FIG. 2B may be extended, as part of step 256, to compare metadata associated with each term (e.g., addresses, other names, phone numbers, email addresses). The term with the most complete metadata may be retained, and the other term discarded from the list. In another scheme, the metadata may be compared to public records which are known to be correct. The term with the most accurate metadata, relative to the public records, may be retained and the other deleted from the list. In yet another scheme, such as when the terms are close or the metadata inconclusive, the two terms may be presented to a user and the user requested to select one of the two terms for deletion. In this case, the term selected for deletion is deleted, and the other term retained in the list. Many other schemes are possible.

In any case, after deduplication, all but one term for each of the sets of matching terms is removed from the list. Term pairs which have third probabilities that do not satisfy the threshold value are deemed to refer to unique entities, and in this case both terms in those term pairs are retained in the list.

While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments. By way of an example, determination steps may not require a processor to process an instruction unless an interrupt is received to signify that condition exists in accordance with one or more embodiments. As another example, determination steps may be performed by performing a test, such as checking a data value to test whether the value is consistent with the tested condition in accordance with one or more embodiments. Thus, the one or more embodiments are not necessarily limited by the examples provided herein.

Figure 4:
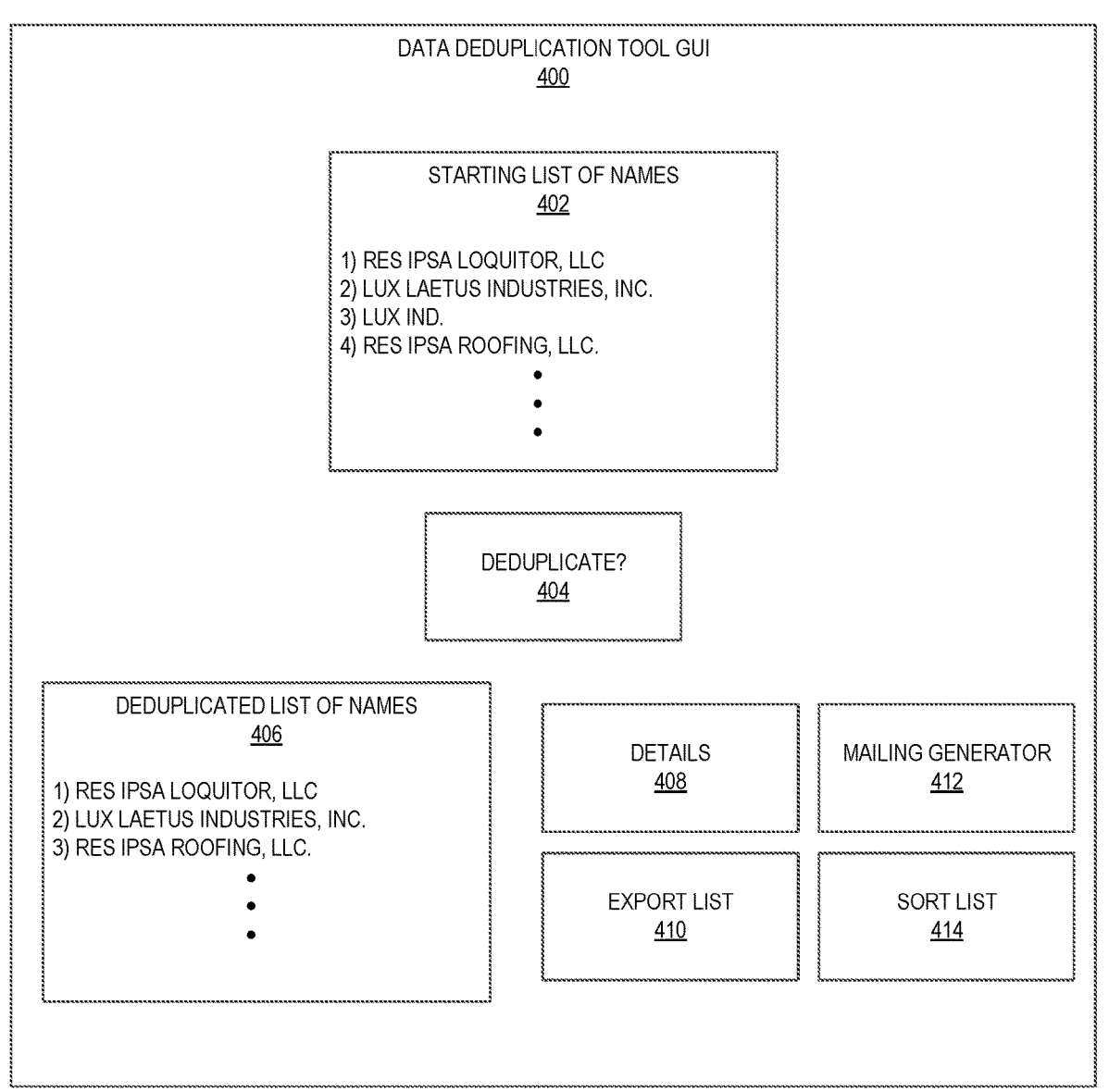
Figure 5:
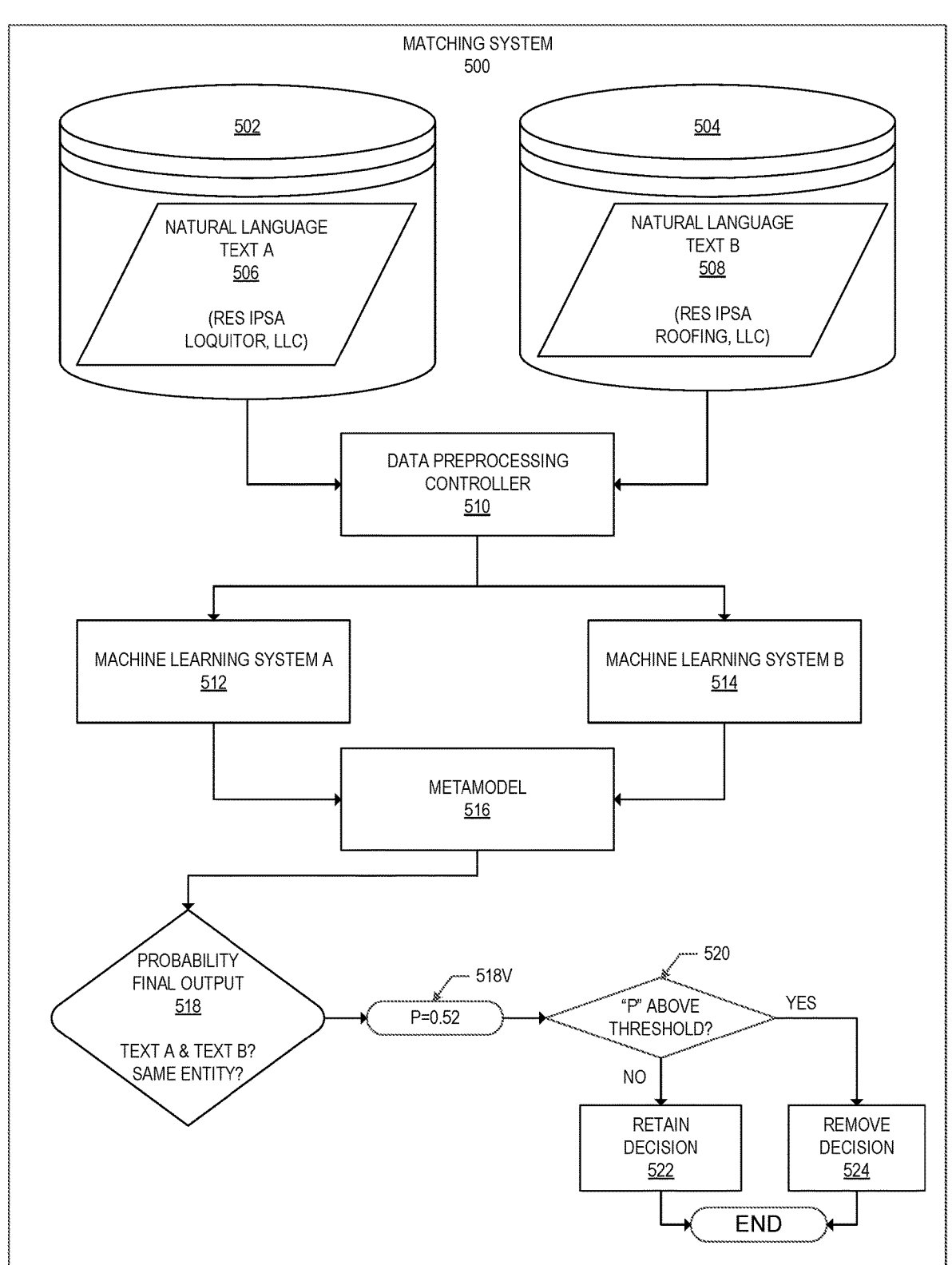

FIG. 3 through FIG. 5 present a specific example of the techniques described above with respect to FIG. 1A through FIG. 2B. More specifically, the example of FIG. 3 through FIG. 5 relates to a combined data integration and deduplication task. The following example is for explanatory purposes only and not intended to limit the scope of the one or more embodiments.

FIG. 3 shows a services provider GUI (300). The term "GUI" means "graphical user interface." The services provider GUI (300) shows the details of two entries of entities obtained from two different databases. In this example, the "entities" are the names of companies obtained from different, but related databases.

For example, in FIG. 3, one of the databases is related to a first business finance software application, and the other of the databases is related to a second business finance software application. Because some of the businesses that use the first business finance software application conduct transactions with entities that use the second business finance software application, and vice versa, when all possible entities mentioned in both databases are combined into a single list, duplications will occur in the single list. For example, as shown explicitly below, sometimes a first user of the first application is a customer of a second user of the second application, and possibly vice versa. Because the information about all entities (i.e., all users of both applications and all referred-to customers in both applications) is obtained from the different databases and combined into a single list, variations in names may occur even when referring to the same entity. For example, a user may call a customer one name, but the customer may call itself by a slightly different name.

It is assumed that names of entities that exactly match may be easily deduplicated from the resulting list. Thus, the task, after combining the data from the two databases and removing exact duplicates, is to deduplicate from the list those slightly different terms that refer to the same entities.

The above procedure is now described in detail with respect to FIG. 3 through FIG. 5. Referring to FIG. 3, the entry "Res Ipsa Loquitor, LLC" (302) refers to a first company and represents the true name of the company as that company calls itself. The "Res Ipsa Loquitor, LLC" (302) entry contains a variety of metadata, such as company contact information 1 (304). The information shown in the company contact information 1 (304) represents the company's own entry as a user of a first business finance software application. Thus, the name, address, email, and phone number shown in the company contact information 1 (304) are accurate.

The "Res Ipsa Loquitor, LLC" (302) entry also includes many invoices to other companies and/or individuals. Shown in FIG. 3 is one invoice, invoice A (306). The invoice A (306) includes the name of another company (i.e., another entity) that is a candidate for addition to the final list. Namely, the name "Lux Ind." refers to an entity, and thus the name "Lux Ind." is initially added to the list of entities.

Attention is now turned to the entry "Lux Laetus Industries, Inc." (308). The "Lux Laetus Industries, Inc." (308) refers to a third company, and represents the true name of the company as that company calls itself. The "Lux Laetus Industries, Inc." (308) entry is an entry in a second database, different than then database that contains the "Res Ipsa Loquitor, LLC" (302) entry. The "Lux Laetus Industries, Inc." (308) contains a variety of metadata, such as company contact information 2 (310). The information shown in the company contact information 2 (310) represents the company's own entry as a user of the second business finance software application. Thus, the name, address, email, and phone number shown in the company contact information 2 (310) are accurate.

The company contact information 2 (310) entry also includes many invoices to other companies and/or individuals. Shown in FIG. 3 is one invoice, invoice B (312). The invoice B (312) includes the name of another company (i.e., another entity) that is a candidate for addition to the final list. Namely, the name "Res Ipsa Roofing, LLC" refers to an entity, and thus the name "Res Ipsa LLC" is initially added to the list of entities.

Attention is now turned to FIG. 4, which shows a data deduplication tool GUI (400) that a user may use to perform the database entry combination and entity deduplication task mentioned with respect to FIG. 3. The data deduplication tool GUI (400) shows a starting list of names (402). The starting list of names (402) is the total list of all possible entity candidates obtained from entity candidates extracted from the "Res Ipsa Loquitor, LLC" (302) and the "Lux Laetus Industries, Inc." (308) entries, as well as entity candidates mentioned in their respective invoices (i.e., "Lux Ind." and "Res Ipsa Roofing, LLC").

Thus, the starting list of names (402) includes all four candidate entities. What is not known, initially, is which of the candidate entities refer to the same entity. The vertical ellipsis in FIG. 4 refers to the fact many more candidate entities may be present in the starting list of names (402).

The user in the example of FIG. 4 then engages the deduplicate widget (404). A widget is a display on a GUI with which a user may interact (e.g., a button, a drop-down menu, a dialog box, etc.). In FIG. 4, the deduplicate widget (404) causes executable code to carry out the methods described with respect to FIG. 2B using the system shown in FIG. 1A through FIG. 1E. Those names that are determined to refer to the same entities are candidates for deduplication, whereas those names that are determined to be unique are retained in the deduplicated list of names (406).

The deduplication operation may then be performed as described with respect to FIG. 2B. In the example of FIG. 4, the automatic process determined that the names "Lux Laetus Industries, Inc." and "Lux Ind." referred to the same entity. However, it is known that the company contact information 2 (310) is the correct entity. Thus, the term "Lux Ind." is correctly deleted from the starting list of names (402), despite the fact that the names "Lux Laetus Industries, Inc." and "Lux Ind" are substantially different from each other.

As a result, the deduplicated list of names (406) contains only three of the four names shown in the starting list of names (402). Note that the names "Res Ipsa Loquitor, LLC" and "Res Ipsa Roofing, LLC" are both correctly retained in the deduplicated list of names (406), as the two names refer to different entities despite their highly similar names. The system of FIG. 1A through FIG. 1F and the methods of FIG. 2A and FIG. 2B provide the programming and tools useful for allowing the computer to correctly identify which terms to deduplicate, and which to retain. The methods and tool are robust, as even though significant variations may appear among names that refer to the same entity, or slight variations may appear among names that refer to different entities, the resulting deduplicated list of names (406) may be substantially accurate.

The data deduplication tool GUI (400) may include other tools as well in order to take further advantage of the deduplicated list of names (406). For example, a details widget (408) may allow a user to show details of a highlighted or selected name within the deduplicated list of names (406). Thus, the contact information, and possibly customer sales information of the entities shown in the deduplicated list of names (406) may be displayed on the data deduplication tool GUI (400).

In another example, an export list widget (410) may allow the user to export the deduplicated list of names (406). The exported list may then be printed and/or shared with others.

In still another example, a mailing generator widget (412) may generate emails and/or address labels for printing on physical mailing envelopes. In this manner, a large batch processing job of contacting many companies via email or parcel post may be performed without sending duplicate messages to the same companies.

In yet another example, a sort list widget (414) may enable the user to sort the deduplicated list of names (406). For example, the deduplicated list of names (406) may be sorted alphabetically, by geographical region, by company sales, by number of employees, by type of business, or any other desirable organizational scheme. Many other different types of widgets and corresponding software functionality may be provided to make further use of the deduplicated list of names (406).

Attention is now turned to FIG. 5. The example of FIG. 5 is a summary of the deduplication process and may be considered another example of the operation of the system shown in FIG. 1A through FIG. 1E.

The 500 includes two databases, database (502) and database (504). The database (502) and database (504) are different databases, but related. The database (502) and the database (504) contain entries that refer, in at least some cases, to the same entities, but use different names to identify those same entities. The database (502) and the database (504) also contain entries that refer, in at least some cases, to different entities that have highly similar names FIG. 5 shows that the methods shown herein will also distinguish similar names that refer to different entities.

Thus, more specifically, the database (502) contains natural language text A (506), which refers to "Res Ipsa Loquitor, LLC", and the database (504) contains natural language text B (508), which refers to "Res Ipsa Roofing, LLC". The natural language text A (506) and the natural language text B (508) refer to different entities. However, because the database (502) and the database (504) also contain entries that also refer to the same entity by different names, it is not initially possible to simply retain both similar, but different names in the final deduplicated list.

Thus, the natural language text A (506) and the natural language text B (508) are provided to a data pre-processing controller (510). The data pre-processing controller (510) may be the pre-processing controller (140) described with respect to FIG. 1B. The pre-processing controller (510) normalizes the natural language text A (506) and the natural language text B (508).

The output of the data pre-processing controller (510) (i.e., the normalized text) is then provided as input two machine learning systems, machine learning system A (512) and machine learning system B (514). Both of the machine learning systems may include one or more machine learning models. In this example, the machine learning system A (512) refers to the machine learning system A (150) shown in FIG. 1D and the machine learning system B (514) refers to the machine learning system B (152) shown in FIG. 1E. In both cases, the outputs of the two machine learning systems are probabilities that the natural language text A (506) and the natural language text B (508) refer to the same entity.

The outputs of the two machine learning systems are provided as input to the metamodel (516). The metamodel (516) may be the machine learning system C (154) described with respect to FIG. 1C. The metamodel (516) generates a probability final output (518) that the natural language text A (506) and the natural language text B (508) refer to the same entity. In this example, the probability output value (518V) is 0.52, which represents a 52% probability that the natural language text A (506) and the natural language text B (508) refer to the same entity.

The probability output value (518V) is then provided as input to the threshold determination process (520). The threshold determination process (520) is a software application that compares the probability output value (518V) to a pre-determined threshold value. If the probability output value (518V) is greater than the threshold value, then, at remove decision (524), a decision is made to remove one of the natural language text A (506) or the natural language text B (508) from the final list of entities (a "yes" determination at threshold determination process (520)). However, if the 58V is less than the threshold value, then, at retain decision (522), a decision is made to retain both of the natural language text A (506) and the natural language text B (508) in the final list of entities (a "no" determination at threshold determination process (520)).

In the example of FIG. 5, the pre-determined threshold value is 0.90. In other words, only if the probability final output (518) is 90% or greater will the matching system (500) determine that the natural language text A (506) and the natural language text B (508) refer to the same entity and delete one of the two text entries as being duplicative. Again, in this example, the probability output value (518V) is 0.52. Because 0.52 is less than 0.90 (a "no" determination at threshold determination process (520)), both the natural language text A (506) in the database (502) and the natural language text B (508) in the database (504) will be included in the final list of entities.

Figure 6A:
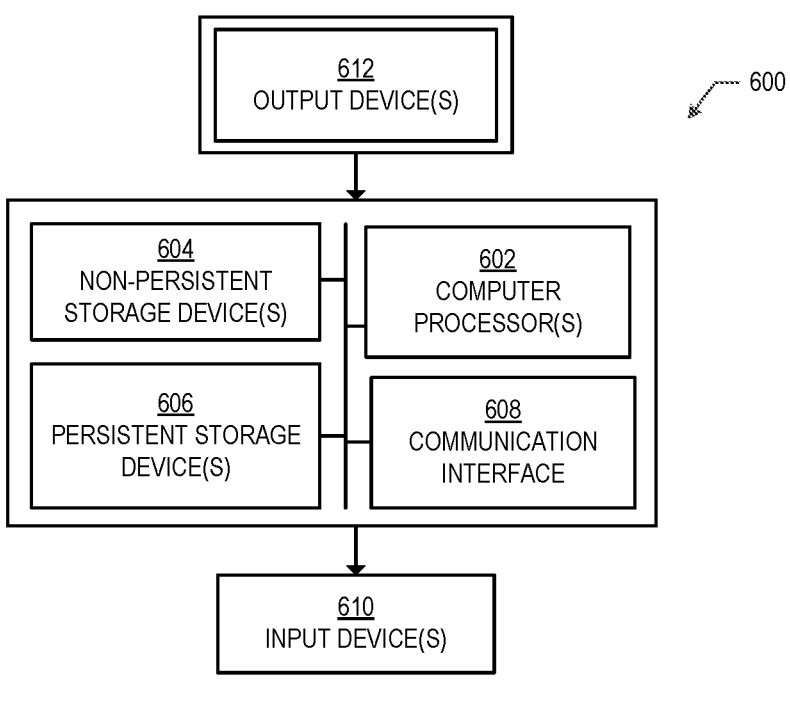
FIG. 6A and FIG. 6B show a computing system and network environment, in accordance with one or more embodiments.
Figure 6B:
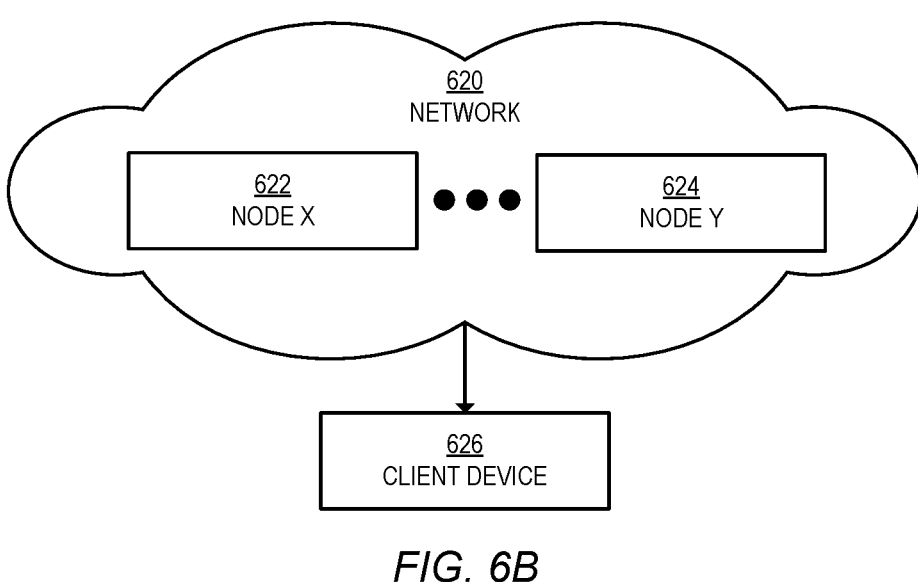

FIG. 6A and FIG. 6B are examples of a computing system and a network, in accordance with one or more embodiments. The one or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 6A, the computing system (600) may include one or more computer processor(s) (602), non-persistent storage device(s) (604) (e.g., volatile memory, such as random access memory (RAM), cache memory), persistent storage device(s) (606) (e.g., a hard disk, an optical drive such as a compact disk (CD) drive or digital versatile disk (DVD) drive, a flash memory, etc.), a communication interface (608) (e.g., Bluetooth interface, infrared interface, network interface, optical interface, etc.), and numerous other elements and functionalities that implement the features and elements of the disclosure.

The computer processor(s) (602) may be an integrated circuit for processing instructions. For example, the computer processor(s) (602) may be one or more cores or micro-cores of a processor. The computing system (600) may also include one or more input device(s) (610), such as a touchscreen, a keyboard, a mouse, a microphone, a touchpad, an electronic pen, or any other type of input device.

The communication interface (608) may include an integrated circuit for connecting the computing system (600) to a network (not shown) (e.g., a local area network (LAN), a wide area network (WAN) such as the Internet, a mobile network, or any other type of network) and/or to another device, such as another computing device.

Further, the computing system (600) may include one or more output device(s) (612), such as a screen (e.g., a liquid crystal display (LCD), a plasma display, a touchscreen, a cathode ray tube (CRT) monitor, a projector, or other display device), a printer, an external storage, or any other output device. One or more of the output device(s) (612) may be the same or different from the input device(s) (610). The input and output device(s) (610 and 612) may be locally or remotely connected to the computer processor(s) (602), the non-persistent storage device(s) (604), and the persistent storage device(s) (606). Many different types of computing systems exist, and the aforementioned input and output device(s) (610 and 612) may take other forms.

Software instructions in the form of computer readable program code to perform the one or more embodiments may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform the one or more embodiments.

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system (600) shown in FIG. 6A, or a group of nodes combined may correspond to the computing system (600) shown in FIG. 6A. By way of an example, the one or more embodiments may be implemented on a node of a distributed system that is connected to other nodes. By way of another example, the one or more embodiments may be implemented on a distributed computing system having multiple nodes, where each portion of the one or more embodiments may be located on a different node within the distributed computing system. Further, one or more elements of the aforementioned computing system (600) may be located at a remote location and connected to the other elements over a network.

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system (600) shown in FIG. 6A. Further, the client device (626) may include and/or perform all or a portion of the one or more embodiments.

The computing system (600) or group of computing systems described in FIGS. 6A and 6B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the one or more embodiments. The processes may be part of the same or different application and may execute on the same or different computing system.

Rather than or in addition to sharing data between processes, the computing system performing the one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the one or more embodiments, may extract one or more data items from the obtained data. For example, the extraction may be performed as follows by the computing system (600) in FIG. 6A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as eXtensible Markup Language (XML)).

The extracted data may be used for further processing by the computing system. For example, the computing system (600) of FIG. 6A, while performing the one or more embodiments, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (600) in FIG. 6A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (a database, a table, a record, a column, a view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (600) of FIG. 6A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (600) of FIG. 6A and the nodes (e.g., node X (622), node Y (624)) and/or client device (626) in FIG. 6B. Other functions may be performed using one or more embodiments.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The term "about," when used with respect to a computer or a computer-executed instruction, refers to a computer engineering tolerance anticipated or determined by a computer scientist or computer technician of ordinary skill in the art. The exact quantified degree of an engineering tolerance depends on the software and/or hardware in use and the technical property being measured. For a non-limiting example, two processes may be "about" concurrent when one process is executed within a pre-defined number of processor operations of the other process. In another non-limiting example in which an algorithm compares a first property to a second property, the first property may be "about" equal to the second property when the two properties are within a pre-determined range of measurement. Engineering tolerances could be loosened in other embodiments; i.e., outside of the above-mentioned pre-determined range in one embodiment, but inside another pre-determined range in another embodiment. In any case, the ordinary artisan is capable of assessing what is an acceptable engineering tolerance for a particular algorithm, process, or hardware arrangement, and thus is capable of assessing how to determine the variance of measurement contemplated by the term "about."

As used herein, the terms "connected to" or "in communication with" contemplate multiple meanings. A connection or communication may be direct or indirect. For example, computer A may be directly connected to, or communicate with, computer B by means of a direct communication link. Computer A may be indirectly connected to, or communicate with, computer B by means of a common network environment to which both computers are connected. A connection or communication may be wired or wireless. A or connection or communication may be temporary, permanent, or semi-permanent communication channel between two entities.

As used herein, an entity is an electronic device, not necessarily limited to a computer. Thus, an entity may be a mobile phone, a smart watch, a laptop computer, a desktop computer, a server computer, etc. As used herein, the term "computer" is synonymous with the word "entity," unless stated otherwise.

While the one or more embodiments have been described with respect to a limited number of embodiments, those skilled in the art, having benefit of this disclosure, will appreciate that other embodiments can be devised which do not depart from the scope of the one or more embodiments as disclosed herein. Accordingly, the scope of the one or more embodiments should be limited only by the attached claims.

What is claimed is:

1. A method comprising:
determining a distance metric from a first natural language text and a second natural language text, wherein:
the first natural language text comprises first unlabeled text,
the second natural language text comprises second unlabeled text, and
the first natural language text is different than the second natural language text;
determining a first probability that the first natural language text and the second natural language text match each other, wherein:
determining the first probability is performed by a first machine learning system using the distance metric, and
the first machine learning system comprises a first supervised machine learning model programmed to operate on labeled data;
determining a second probability that the first natural language text and the second natural language text match each other, wherein:
determining the second probability is performed by a second machine learning system using the first natural language text and the second natural language text, and
the second machine learning system comprises an unsupervised machine learning model;
determining a third probability that the first natural language text matches the second natural language text, wherein:
determining the third probability is performed by a metamodel using both the distance metric and the second probability, and
the metamodel comprises a second supervised machine learning model; and
deduplicating, from a data repository and responsive to the third probability exceeding a threshold, one of the first natural language text and the second natural language text.

2. The method of claim 1, further comprising:
pre-processing the first natural language text and the second natural language text prior to determining the distance metric.

3. The method of claim 2, wherein pre-processing comprises:
normalizing the first natural language text and the second natural language text.

4. The method of claim 1, further comprising:
labeling the first natural language text and the second natural language text as a labeled text couple.

5. The method of claim 4, further comprising:
training at least one of the first machine learning system and the second machine learning system using the labeled text couple.

6. The method of claim 1, wherein the first machine learning system comprises:
a random forest machine learning system comprising a plurality of random forests, and wherein the random forest machine learning system is configured to:

perform a plurality of classifications, including one classification for each of the plurality of random forests;
perform a majority voting process on the plurality of classifications; and
output a final classification from the majority voting process.

7. The method of claim 1, wherein the distance metric comprises a plurality of distance metrics.

8. The method of claim 1, wherein the second machine learning system comprises:
a first long short term memory (LSTM) network; and
a second LSTM network, identical to the first LSTM network, wherein the second machine learning system is configured to:
receive the first natural language text at the first LSTM network;
receive the second natural language text at the second LSTM network;
generate a first sub-output by the first LSTM network;
generate a second sub-output by the second LSTM network;
evaluate a loss function between the first sub-output and the second sub-output; and
generate the second probability from the loss function.

9. The method of claim 1, wherein the second machine learning system comprises a Siamese unsupervised machine learning system.

10. The method of claim 1, wherein the metamodel comprises:
a logistic regression model.

11. The method of claim 1, further comprising:
training, iteratively, the first machine learning system;
training, iteratively, the second machine learning system; and
training, iteratively, the metamodel.

12. A system comprising:
a processor;
a data repository in communication with the processor and storing:
a first natural language text,
a second natural language text, different than the first natural language text,
a distance metric representing a distance between the first natural language text and the second natural language text,
a first probability that the first natural language text and the second natural language text match each other,
a second probability that the first natural language text and the second natural language text match each other,
a third probability that the first natural language text and the second natural language text match each other, and
a threshold value;
a pre-processing controller executable by the processor to:
receive the first natural language text and the second natural language text,
a server controller executable by the processor to generate the distance metric from the first natural language text and the second natural language text;
a first machine learning system comprising a first unsupervised machine learning system executable by the processor to:
obtain, as a first input, the distance metric and determine as a first output the first probability;

a second machine learning system comprising a second unsupervised machine learning system executable by the processor to:

take, as a second input the first natural language text and as a third input the second natural language text, and determine, as a second output, the second probability; and a metamodel comprising a second supervised machine learning system executable by the processor to:

obtain, as input, the first probability and the second probability and determine, as output, the third probability; and wherein the server controller executable by the processor to deduplicate, from the data repository and responsive to the third probability exceeding the threshold value, one of the first natural language text and the second natural language text.

13. The system of claim 12, wherein the pre-processing controller is further executable by the processor to:

normalize, prior to the server controller determining the distance metric, the first natural language text and the second natural language text, and label the first natural language text with a first label and labeling the second natural language text with a second label.

14. The system of claim 12, further comprising:

a training controller executable by the processor to perform a second computer-implemented method comprising:

training, iteratively, the first machine learning system, training, iteratively, the second machine learning system, and training, iteratively, the metamodel.

15. The system of claim 12, wherein:

the first machine learning system comprises a random forest model;

the second machine learning system comprises a Siamese long short term memory network; and the metamodel comprises a logistic regression model.

* * * * *